United States Patent [19]
Cooke

[11] Patent Number: 5,857,491
[45] Date of Patent: Jan. 12, 1999

[54] VALVE ARRANGEMENT

[75] Inventor: Michael Peter Cooke, Gillingham, Great Britain

[73] Assignee: Lucas Industries public limited company, Solihull, England

[21] Appl. No.: 847,713

[22] Filed: Apr. 28, 1997

[30] Foreign Application Priority Data

May 22, 1996 [GB] United Kingdom ............... 9610819

[51] Int. Cl.⁶ .................................................. F15B 13/044
[52] U.S. Cl. ............................... 137/627.5; 137/596.17; 137/596.2; 251/129.06
[58] Field of Search .............. 251/129.01, 129.06, 251/129.08; 137/596.17, 596.2, 627.5; 123/456, 447

[56] References Cited

U.S. PATENT DOCUMENTS

| | | |
|---|---|---|
| 4,529,164 | 7/1985 | Igashira et al. . |
| 4,617,952 | 10/1986 | Fujiwara ............................ 137/596.17 |
| 4,719,889 | 1/1988 | Amann ..................................... 123/447 |
| 4,722,312 | 2/1988 | Yamada et al. . |
| 4,911,127 | 3/1990 | Perr ......................................... 123/447 |
| 5,079,472 | 1/1992 | Uhl et al. . |
| 5,445,185 | 8/1995 | Watanabe ........................... 137/596.17 |
| 5,456,233 | 10/1995 | Felhofer . |
| 5,460,202 | 10/1995 | Hanley ............................... 137/596.17 |

FOREIGN PATENT DOCUMENTS

WO 8607429  12/1986  United Kingdom .

*Primary Examiner*—John Rivell
*Assistant Examiner*—Ramyar Farid
*Attorney, Agent, or Firm*—Trexler, Bushnell, Giangirorgi & Blackstone, Ltd.

[57] ABSTRACT

A valve arrangement comprises a piezo electric member arranged to control fuel flow through an orifice, the piezo electric member being operable to flex away from the orifice to allow an increased rate of fuel flow therethrough. The piezo electric member is also engageable with a valve member of a pressure relieving valve to control lifting of the valve member from a seating.

6 Claims, 2 Drawing Sheets

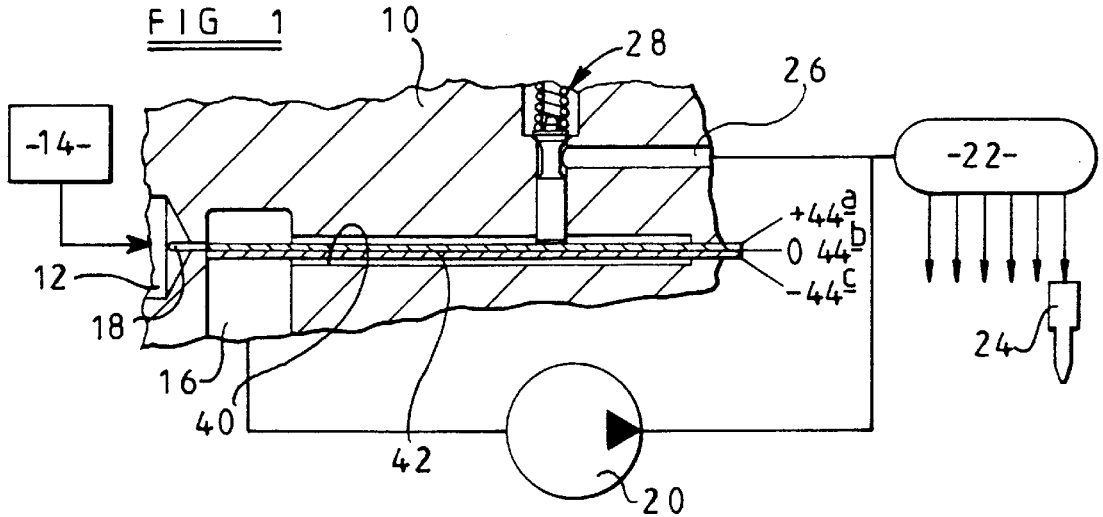
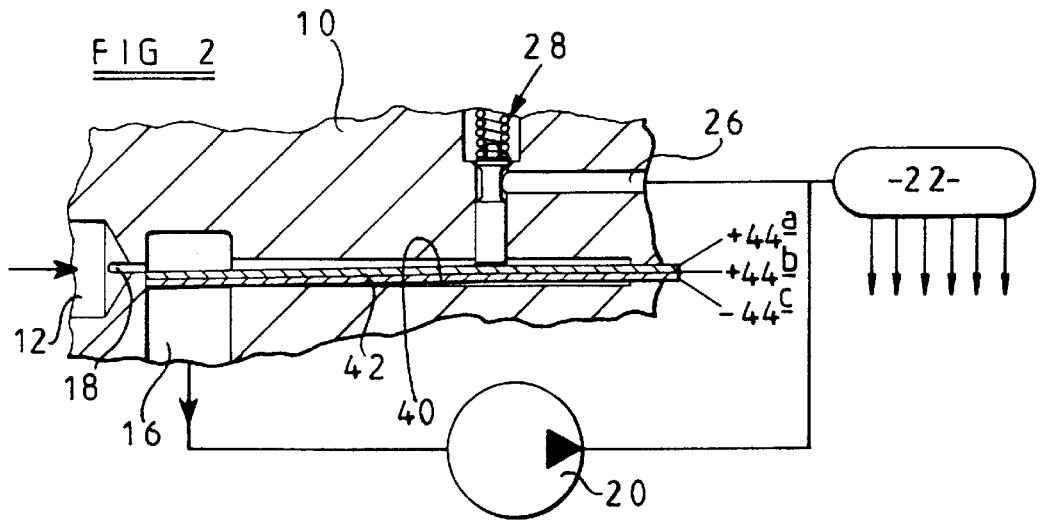
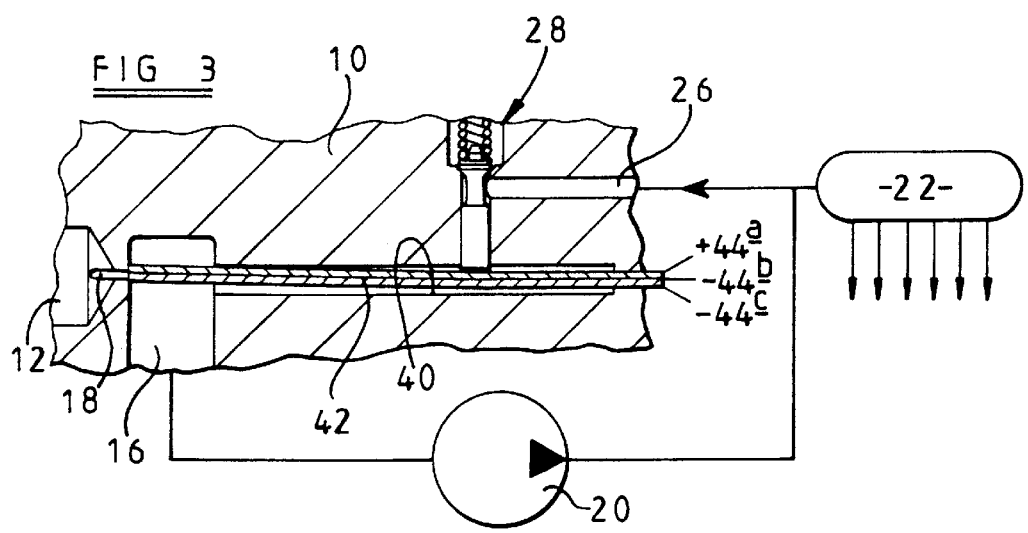

VALVE ARRANGEMENT

BACKGROUND

This invention relates to a valve arrangement, and in particular to a control valve arrangement suitable for use in controlling the fuel pressure within the high pressure common rail or accumulator of a fuel supply system for an internal combustion engine.

The fuel pressure within a common rail or accumulator is determined by the rate of fuel supply thereto from a fuel pump and the rate of fuel delivery from the common rail or accumulator to the injectors of the associated engine. The rate of fuel supply to the common rail or accumulator may be controlled by controlling the rate of fuel supply to the fuel pump using a suitable metering arrangement.

OBJECT AND SUMMARY

It is an object of the invention to provide a control valve arrangement permitting control of the fuel pressure within a common rail or accumulator of a fuel supply system.

According to the present invention there is provided a control valve arrangement comprising a housing, a piezo electric member located within the housing and arranged to control the flow of fuel through an orifice provided in the housing, and a pressure relieving valve for relieving the fuel pressure within a common rail or accumulator of an associated fuel supply system, the pressure relieving valve being actuable under the control of the piezo electric member.

The piezo electric member is conveniently arranged to flex in a first position to permit fuel flow through the orifice, and in a second direction to open the pressure relieving valve.

BRIEF DESCRIPTION OF THE DRAWINGS

The invention will further be described, by way of example, with reference to the accompanying drawings, in which:

FIG. 1 is a diagrammatic cross-sectional view of a control valve;

FIGS. 2 and 3 are views illustrating operation of the valve of FIG. 1; and

DESCRIPTION

Figure 4:
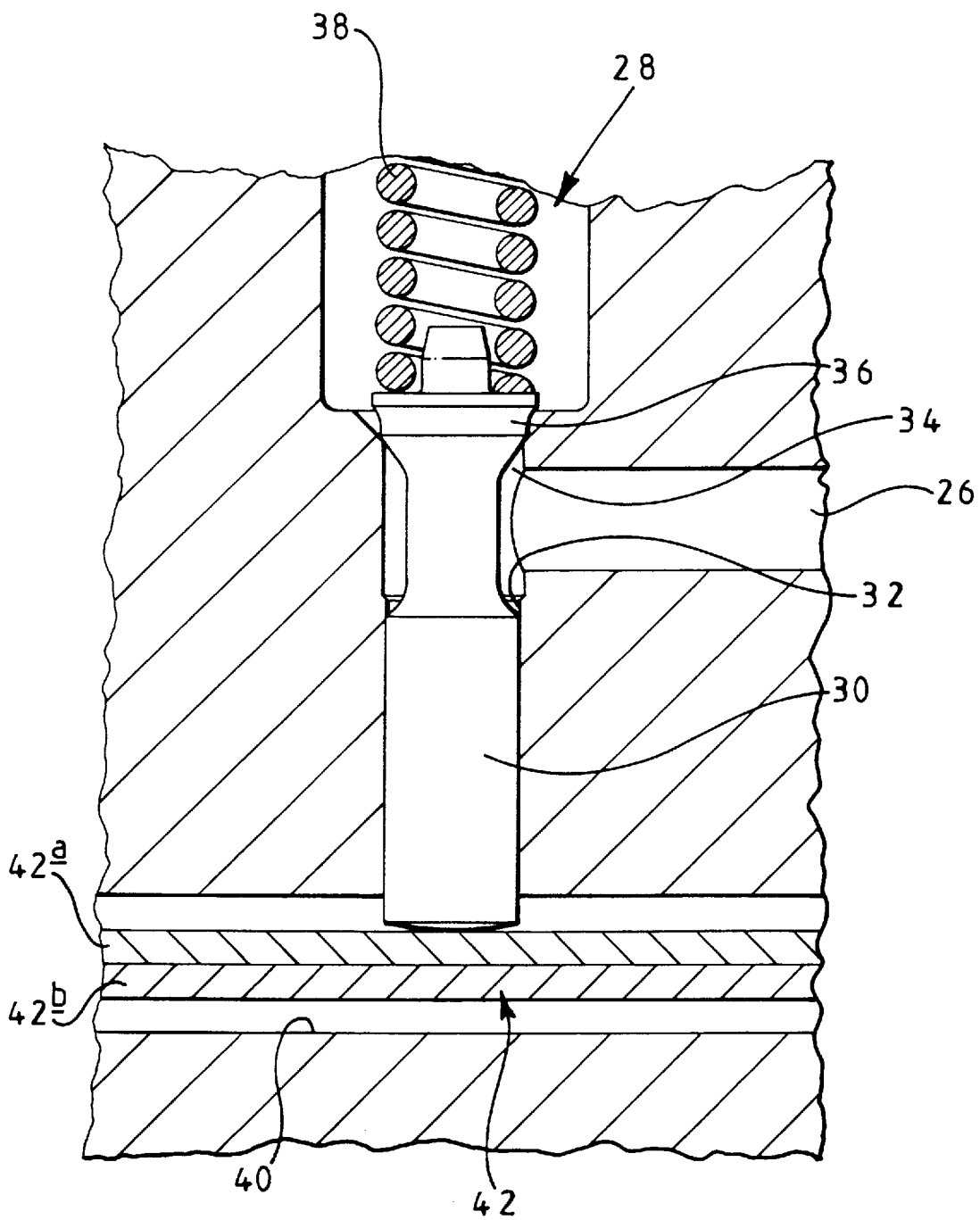
FIG. 4 is an enlarged view of part of FIG. 1.

The control valve illustrated in the drawings comprises a housing 10 which is provided with an inlet port 12 arranged to be supplied with fuel from a reservoir 14, the inlet 12 communicating with a chamber 16 through an elongate slot 18. The chamber 16 communicates through suitable passages with a high pressure fuel pump 20 the outlet of which is arranged to supply fuel under high pressure to a common rail 22 or accumulator which is arranged, in turn, to supply fuel to the injectors 24 (only one of which is shown) of an associated engine.

As illustrated in FIG. 1, the common rail 22 communicates with a passage 26 provided in the housing 10, the passage 26 communicating with a pressure relief valve 28 (illustrated in greater detail in FIG. 4).

The pressure relief valve 28 comprises a valve member 30 which is slidable within a bore 32 provided in the housing 10, the valve member 30 including a peripheral groove which defines, with the bore 32, an annular chamber 34 which communicates with the passage 26. Adjacent the chamber 34, the bore 32 is shaped so as to define a frusto-conical seating against which an enlarged region 36 of the valve member 30 is sealingly engageable to control the flow of fuel from the chamber 34 to a suitable low pressure drain (not shown). The valve member 30 is biassed by a spring 38 towards a position in which the enlarged end region 36 engages the seating to substantially prevent fuel flowing from the chamber 34 to the low pressure drain.

As illustrated in FIG. 1, the housing 10 includes an elongate chamber 40 which communicates with the chamber 16, a piezo electric member 42 being located within the chamber 40 and extending into the chamber 16, one end of the piezo electric member 42 being rigidly secured to the housing 10. The bore 32 within which the valve member 30 is slidable communicates with the chamber 40, an end portion of the valve member 30 engaging an upper surface of the piezo electric member 42 when the piezo electric member 42 occupies the position shown in FIG. 1, although a small gap may be left therebetween. The end of the piezo electric member 42 remote from the end which is rigidly secured to the housing 10 extends adjacent the slot 18 such that when the piezo electric member 42 is in the rest position illustrated in FIG. 1, the end thereof obscures the slot 18 thus preventing fuel from flowing from the inlet 12 to the chamber 16. Fuel is therefore prevented from being supplied to the pump 20 and from there to the common rail 22.

The piezo electric member 42 conveniently takes the form of a plurality of layers of piezo ceramic material with electrodes provided therebetween, and in the accompanying diagrammatic drawings, the piezo electric member 42 comprises an upper layer 42a and a lower layer 42b with an electrode 44b disposed therebetween in contact with the inner faces of the layers 42a, 42b. Electrodes 44a, 44c are formed on the outer faces of the two layers 42a, 42b.

When equal and opposite voltages are applied between the faces of the two layers 42a, 42b, the mechanical forces produced in the two layers 42a, 42b are balanced so that the member 42 occupies its rest position. If the voltages applied to the electrodes 44a, 44b are the same, the member 42 flexes downwardly as shown in FIG. 2 due to the mechanical force developed in the lower layer 42b. Similarly, if the voltages applied to the electrodes 44b, 44c are the same, the member 42 flexes upwardly as shown in FIG. 3 due to the mechanical force developed in the upper layer 42a.

Although the diagrammatic drawings show the member 42 as being composed of two layers, in practice the member may include up to, for example, 100 layers of PXE piezo electric material, each layer being approximately 20 μm thick. Further, flexing of the member may occur as a result of part of the member extending whilst another part shrinks due to the application of appropriate voltages thereto.

When the member 42 flexes downwardly to the position illustrated in FIG. 2, the end region of the member 42 no longer obscures the slot 18 thus fuel is permitted to flow from the inlet 12 through the slot 18 to the chamber 16 and from there to the pump 20. The quantity of fuel supplied to the pump 20 is dependent upon the amount of flexing induced in the piezo electric member 42 which in turn is dependent upon the magnitude of the voltage applied thereto. The quantity of fuel supplied to the pump 20 can therefore be metered using the control valve arrangement. As the enlarged region 36 of the valve member 30 engages its seating when the piezo electric member 42 is in its rest position, flexing of the piezo electric member 42 to the position illustrated in FIG. 2 does not result in the enlarged region 36 of the valve member 30 lifting from its seating, thus the valve 28 does not open.

When the voltages applied to the piezo electric member 42 are altered to cause the piezo electric member 42 to flex upwardly to the position illustrated in FIG. 3, the end region thereof obscures the slot 18 thus preventing fuel from flowing to the chamber 16, the flexing of the piezo electric member 42 lifting the valve member 30 against the action of the spring 38 to lift the enlarged region 36 thereof from its seating and permit fuel to flow through the passage 26 past the valve member 30 to the low pressure drain. The pressure of fuel within the common rail 22 is therefore relieved.

As illustrated most clearly in FIG. 4, the shaping of the enlarged region 36 and of the seating is such that the seating diameter is greater than the diameter of the remainder of the valve member 30. The valve member 30 is therefore not pressure balanced, the application of pressure to the chamber 34 resulting in forces acting on the valve member 30 tending to lift the enlarged region 36 from its seating, these forces being countered by the action of the spring 38. Should the pressure of fuel within the chamber 34 increase sufficiently to enable the valve member 30 to move against the action of the spring 38, such movement results in the fuel pressure within the passage 26 and common rail 22 being relieved, even though the piezo electric member 42 may not be in the position illustrated in FIG. 3. Such a design of pressure relieving valve 28 thus enables automatic opening of the pressure relief valve 28 should the pressure in the chamber 34 become excessively large.

As the piezo electric member 42 is supported at one end only, the application of the cyclic forces thereto tend to result in the piezo electric member 42 vibrating. By designing the chamber 40 to be of dimensions similar to the piezo electric member 42 but sufficiently large to enable the piezo electric member 42 to flex as illustrated in FIGS. 2 and 3, the viscous drag due to the fuel present in the chamber 40 damps the vibrational movement of the piezo electric member 42.

A relatively great amount of movement of the end of the piezo electric member 42 is required to control the rate of flow of fuel through the slot 18, less movement being required to actuate the pressure relief valve 28, although a greater force must be applied to the valve member 30 in order to open the pressure relief valve 28. The arrangement illustrated in the accompanying drawings is advantageous in that these conditions are satisfied.

Although the figures illustrate the member 42 in its extreme positions, it will be appreciated that by applying smaller voltages to the layers, the member 42 can occupy intermediate positions thus permitting relatively accurate control of the rate of fuel flow through the slot 18, and hence in accurate metering of the quantity of fuel supplied to the pump 20. Clearly, if the quantity of fuel supplied to the pump 20 can be accurately controlled, and if fuel can be removed from the common rail 22 to drain relatively easily and accurately, then the pressure of fuel with the common rail 22 can be accurately controlled.

What is claimed is:

1. A valve arrangement comprising a housing, a piezoelectric member located within the housing and having a fixed first end and a second Moveable end, the piezoelectric member generally linearly extending between the first and second ends, the piezoelectric member being arranged to control the rate of flow of fuel to an associated fuel supply system through an orifice provided in the housing by controlling the degree by which the orifice is obscured by the second end of the piezoelectric member, and a pressure relieving valve for relieving the fuel pressure within a common rail or accumulator of the associated fuel supply system, the pressure relieving valve being actuable under the control of the piezoelectric member, the piezoelectric member engaging pressure relieving valve at a location between the first and second ends.

2. A valve arrangement as claimed in claim 1, wherein the piezo electric member is arranged to flex in a first direction to permit fuel flow through the orifice, and in a second direction to open the pressure relieving valve.

3. A valve arrangement as claimed in claim 1, wherein the piezo electric member comprises a plurality of layers of piezo ceramic material with electrodes located therebetween.

4. A valve arrangement as claimed in claim 1, wherein the pressure relieving valve comprises a valve member biased by a spring into engagement with a seating, the valve member being engageable with the piezo electric member to control operation of the pressure relieving valve.

5. A valve arrangement as claimed in claim 4, wherein the diameters of the seating of the pressure relieving valve and a part of the valve member upstream of the seating are selected such that the application of high pressure fuel to the common rail or accumulator results in a force being applied to the valve member acting against the spring.

6. A valve arrangement as claimed in claim 1, further comprising damping means for damping movement of the piezo electric member.

* * * * *